United States Patent [19]

Hawk

[11] 4,315,431

[45] Feb. 16, 1982

[54] ADJUSTABLE FLOW DIVIDER FOR MASS FLOWMETERS

[75] Inventor: Charles E. Hawk, Newport News, Va.

[73] Assignee: Teledyne Industries, Inc., Los Angeles, Calif.

[21] Appl. No.: 195,512

[22] Filed: Oct. 9, 1980

[51] Int. Cl.³ .......................... G01F 5/00; F15D 1/14
[52] U.S. Cl. .................................. 73/203; 138/43; 138/46
[58] Field of Search .................. 73/202, 203; 138/43, 138/46

[56] References Cited

U.S. PATENT DOCUMENTS 2,887,129  5/1959  Stear ........................................ 138/43
3,042,079  7/1962  Swift et al. ............................. 138/43
3,805,610  4/1974  Jacobs ..................................... 138/43

Primary Examiner—Herbert Goldstein
Attorney, Agent, or Firm—Cushman, Darby & Cushman

[57] ABSTRACT

An adjustable flow divider for a mass flowmeter useful in shunting a portion of a fluid flow from a main supply line. The adjustable flow divider includes a porous tube (32) having a plurality of longitudinally extending projections (34) on the inner surface thereof. An externally threaded screw plug (36) is adjustably positioned within the porous tube forming a seal with the projections and exposing to fluid flow an area of porous material related to the position of the plug within the tube. The plug's position is adjustable from the outlet end of the flow divider while the divider is in use.

12 Claims, 3 Drawing Figures

ADJUSTABLE FLOW DIVIDER FOR MASS FLOWMETERS

BACKGROUND OF THE INVENTION

This invention relates generally to flowmeters and more specifically to flow dividers used within flowmeters to shunt a portion of a fluid flow from a main conduit.

In various flowmeter arrangements, it is desirable to measure the flow of a fluid within a main conduit. Certain flowmeter arrangements shunt a portion of the fluid flow away from the main conduit, measure either the shunted fluid flow or the unshunted fluid flow as a representative sample, and then combine the two fluid flows back into the main conduit. If the flowmeter is properly calibrated, the flow rate of the representative sample will provide an indication of the flow rate within the main conduit.

Mass flowmeters of the heated conduit type in particular, force a fluid flow in a main conduit to be measured through a flow divider so that a portion thereof flows through a heated conduit sensor section. The heated conduit sensor section measures a small amount of flow, usually in the 10-50 SCCM range. Since the flow characteristic is linear and the conduit very long compared to its diameter, it exhibits a linear relationship of mass flow vs pressure drop (P) required to create that flow, in its normal working range.

One example of a heated conduit-type flowmeter arrangement is shown in U.S. Pat. No. 4,041,757—Baker et al, commonly assigned with the present application. In U.S. Pat. No. 4,041,757, a portion of the fluid streaming through a main supply line is diverted in a shunt path by a conduit which is electrically heated from a constant power source. A thermoelectric device associated with the shunt conduit measures the temperatures at points along the shunt. These temperatures are related to the flow rate through the shunt and therefore provide an indication of the flow rate within the main conduit. There are other flowmeter arrangements that similarly depend upon flow dividers for measuring the flow of a representative sample of fluid shunted away from the flow through a main supply line.

Other known flow dividers are illustrated by U.S. Pat. No. 3,559,482—Baker et al (1968); and U.S. Pat. No. 3,851,526—Drexel (1973). These flow dividers utilize multiple capillary-like tubes having similar flow characteristics to one another. In order to alter the range of the flowmeter, the capillary-like matrix must be changed in steps by substituting tubes. Thus, it is not possible to smoothly change the flow dividing ratio.

Another known flow divider is illustrated by U.S. Pat. No. 3,805,610—Jacobs (1974) which utilizes a porous sintered material in which the porosity and/or effective working area is altered in order to change the flow range of the shunt. Its range is adjustable by changing the portion of the porous material extending beyond an annular ring (rib). However, if the annular ring is made of metal, then attempting to alter the range of the shunt can deform the outer surface of the porous sintered material permanently eliminating much of the porosity and rendering it useless. If the annular ring were fabricated from an elastic material, the usefulness of the shunt would be limited to those fluids that would not attack that particular elastomer from which the ring was fabricated.

The obvious approach to providing a smoothly adjustable flow divider would be to provide a porous threaded sleeve or tube associated with an adjustable threaded plug to change the working area of the divider. This is impractical since threading the porous material would deform it thereby, closing the pores, and rendering it virtually useless. The present invention is particularly directed to overcoming the problem just described so as to produce an adjustable flow divider having distinct operational advantages.

SUMMARY OF THE INVENTION

The flow divider according to the present invention comprises a porous tube having an inlet end for receiving a portion of a fluid flow to be measured, the porous tube having a plurality of longitudinally extending projections on the inner surface thereof; a generally cylindrically shaped plug, inserted within the tube and having a threaded outer surface, the thread diameter of said plug being only slightly larger than the inside diameter of said tube, the plug being self-threading with the projections as the plug moves within the tube and forming a seal to fluid flow between said tube and said plug; and means for adjusting the position of the plug along the tube thereby varying the total porous surface area exposed to the fluid and regulating the amount of fluid flow therethrough, whereby the amount of fluid flow through the flow divider is controlled.

The flow divider according to the present invention permits a simple wrench adjustment to set the divider ratio precisely over a nearly infinite number of increments up to the maximum of a particular shunt. Replaceable tubes of varying sizes and porosity extend the ranges over extremely wide limits in steps. The combination provides the possibility of an infinite number of ranges from a relatively few tube sizes. Also the tubes are reusable, i.e. the flow settings may be changed back and forth numerous times without permanent deformation of the usable porous areas.

BRIEF DESCRIPTION OF THE DRAWINGS

The invention will now be described in further detail with reference to the accompanying drawings wherein.

DETAILED DESCRIPTION OF THE PREFERRED EMBODIMENT

Figure 1:
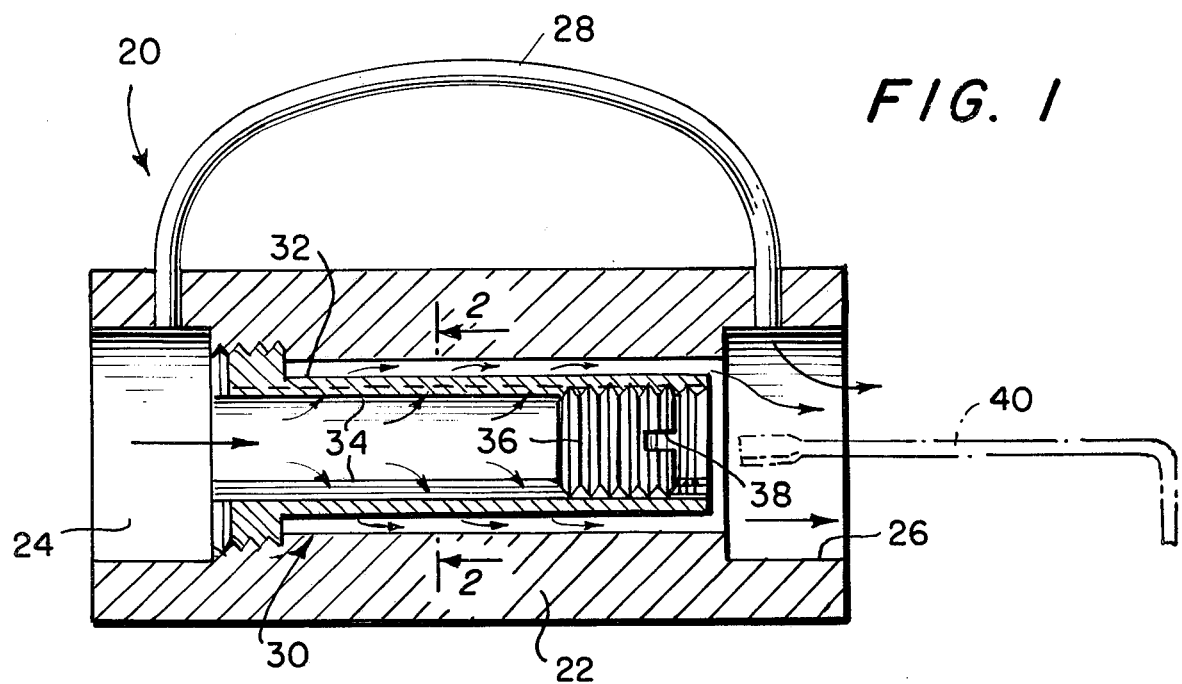
FIG. 1 is a cross-sectional view of an adjustable flow divider according to the present invention.

Referring now to the drawings wherein like reference numerals designate corresponding parts throughout the several views, and referring specifically to FIG. 1, there is shown a cross-sectional view of an adjustable flow divider according to the present invention. The adjustable flow divider is designated generally by reference numeral 30. Adjustable flow divider 30 is shown in place within a mass flowmeter 20 of the heated conduit type. Mass flowmeter 20 includes a flowmeter body 22, a flowmeter inlet port 24, an outlet port 26, and a heated conduit section 28.

In mass flowmeters of the heated conduit type, heat in known quantities is added to the conduit. The cooling effect (heat dissipation) of the flowing stream becomes a measure of the flow rate. Either the temperature difference at spaced points along the heated conduit or the amount of energy required to maintain a heated element at a constant temperature is measured.

For measuring large flow rates, a flow divider is utilized to bypass a portion of the flow around heated conduit section 28. Heated conduit section 28 usually measures a small amount of flow, usually in the 10–50 SCCM range. Since the flow characteristic is linear and the heated conduit section 28 very long compared to its diameter, it exhibits a linear relationship of mass flow vs. the pressure drop (P) required to create that flow in its normal working range. Thus, a flow divider can be used to shunt a portion of the flow away from heated conduit section 28 and the flow measured by the heated conduit section will be proportional to the total flow through the flowmeter, i.e, the flow through heated conduit section 28 plus the flow shunted away from the heated conduit section by the flow divider.

Flow divider 30, according to the present invention, provides an adjustable shunt for diverting a portion of a fluid flow entering inlet port 24 away from heated conduit section 28. It is adjustable and provides nearly an infinite shunting ratio range between a minimum and maximum for a particular flow divider size.

The heart of adjustable flow divider 30 is a porous tube 32, open on its outlet end and threaded on its inlet end. As an alternative, porous tube 32 could be fastened to a threaded ring at its inlet end. By having threads at its inlet end, porous tube 32 can be easily installed and removed within inlet port 24 of the flowmeter. Tube 32 is fabricated from a porous material such as sintered #316 stainless steel so as to provide small diameter passages of long length through the wall of the tube. The porosity of such a material is typically in the 2–50 micron size.

Figure 2:
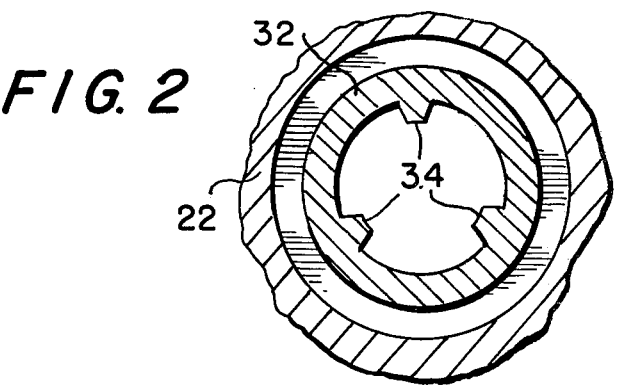
FIG. 2 is a sectional view taken along line 2—2 of FIG. 1.

Porous tube 32 is fabricated with three longitudinally extending projections 34 run on the interior surface of the tube and traversing its entire length. Projections 34 are shown most clearly in FIG. 2 which is a cross-sectional view taken along line 2—2 of FIG. 1. Although three projections 34 are shown in this preferred embodiment, the number is not critical to the practice of this invention. Based upon the size of adjustable flow divider 30, other numbers of projections 34 may be appropriate. Longitudinally extending projections 34 receive the threads of a screw plug 36 shown in FIGS. 1 and 3. Screw plug 36 closes the outlet end porous tube 32 providing a barrier to fluid flow, thereby forcing the fluid to pass through the pores of porous tube 32. Screw plug 36 is adjustable within the porous tube 32 along its entire length. As screw plug 36 is threaded into porous tube 32 from the tube's outlet end, it taps threading in projections 34 and reduces the effective area of the tube through which the fluid can pass. In addition to providing female threads for screw plug 36, projections 34 accomplish another important function. As screw plug 36 is threaded into the porous tube 32 to reduce its effective area, projections 34 extend to the roots of the threads, effectively sealing the threads so leakage does not occur. If any leakage does occur, the leakage passages are so small that they retain the same pressure drop vs. flow linearity as the porous material of porous tube 32 itself and merely become part of the adjustment of the screw plug.

Figure 3:
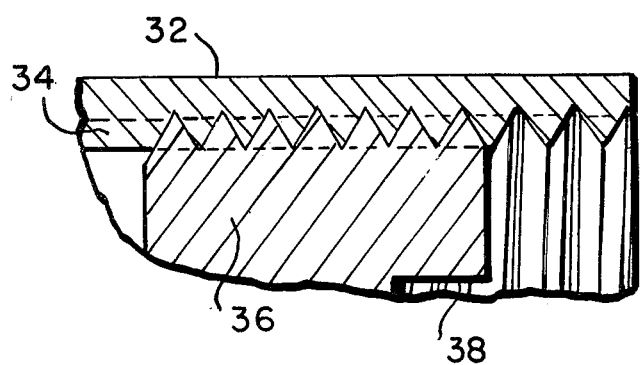
FIG. 3 is an enlarged cross-sectional view showing a portion of a screw plug positioned within a tube and illustrating the nature of the seal therebetween.

Referring now to FIG. 3, there is shown an enlarged portion of adjustable flow divider 30 showing in greater detail the interaction of screw plug 36 with longitudinally extending projections 34 and porous tube 32. The interior passage of porous tube 32 is constructed to be of slightly (approximately 0.003 inches) less diameter than the screw plug's outer thread diameter. Thus, the outer edges of the plug's threads cut into the sintered material of porous tube 32, further contributing to effective sealing against leakage by the projections 34. The advantage derived from this arrangement is that it provides good sealing and mechanical strength while leaving the majority of the surface area of porous tube 32 free from any deformation that would plug its pores.

Screw plug 36 includes a socket head 38, accessible from the outlet end of the flowmeter, by which the position of the screw plug can be adjusted from the outlet side of the flowmeter even during its operation. Socket head 38 is designed to mate with an adjusting tool 40 so that the user can provide such adjustment.

For a given porosity, diameter, and length of porous tube 32, screw plug 36 can be adjusted to obtain nearly a continuously variable range of fluid flow for that particular divider size (porosity, diameter, and length of shunt). This is of particular advantage when calibrating for a new fluid. Adjustable flow divider 30 may be utilized with a first fluid and then later utilized to measure the flow of a second fluid. If the latter requires a correction of 23%, for example, for the shunting ratio to make the indication obtained from heated conduit section 28 equal to a full scale meter reading, it can be easily and precisely set by adjustment of screw plug 36. In utilizing conventional flow dividers, the shunt elements must be changed in fairly large steps, and the electrical values in the circuitry of heated conduit section 28 must be adjusted for precise calibration. This often results in as little as one-quarter of the available signal derived from the electronic circuitry associated with heated conduit section 28 being utilized. Naturally, this results in signal levels on occasion becoming so low as to seriously degrade the flowmeter's performance. However, with the fine resolution permitted by adjustable flow divider 30 according to the present invention, the electrical signal can be maximized, resulting in improved performance, convenience, and flexibility.

It should be understood, of course, that the foregoing description relates only to the presently preferred embodiment of the invention and that numerous modifications or alterations may be made therein without departing from the spirit and scope of the invention as set forth in the appended claims.

I claim:

1. An adjustable flow divider for a flowmeter comprising:
   a porous tube having an inlet end for receiving a portion of a fluid flow to be measured, said tube having a plurality of longitudinally extending projections on an inner surface thereof;
   a generally cylindrically shaped plug, inserted within said tube and having a threaded outer surface, the thread diameter of said plug being larger than the inside diameter of said tube, said plug tapping said projections as the plug moves within said tube to form a seal against fluid flow between said tube and the plug; and
   means for adjusting the position of said plug relative to said tube to vary the total porous surface area exposed to said fluid thereby regulating the amount of fluid flow through the tubes.

2. An adjustable flow divider according to claim 1 wherein said tube includes pores in the size range of 2-50 microns.

3. An adjustable flow divider according to claim 1 wherein said inlet end of said porous tube is threaded for permitting selective attachment and interchangeability with said flowmeter.

4. An adjustable flow divider according to claim 1 wherein said porous tube is fabricated from sintered stainless steel so as to provide pores of long length with respect to their diameter.

5. A flowmeter comprising:
a heated conduit sensor member for receiving a portion of a flow to be measured; and
an adjustable flow divider for shunting away from said heated conduit sensor member a remaining portion of said flow to be measured, said adjustable flow divider comprising:
a porous tube having an inlet end for receiving a fluid flow to be measured, said tube having a plurality of longitudinally extending projections on an inner surface thereof;
a generally cylindrically shaped plug, inserted within said tube and having a threaded outer surface, the thread of said plug tapping said projections as the plug moves within said tube to form a seal against said fluid flow between said tube and the plug; and
means for adjusting the position of said plug relative to said tube to vary the total porous surface area exposed to said fluid thereby regulating the amount of flow through the tube.

6. A flowmeter according to claim 5 wherein said tube includes pores in the size range of 2-50 microns.

7. A flowmeter according to claim 5 wherein said inlet end of said porous tube is threaded for permitting selective attachment and interchangeability with said flowmeter.

8. A flowmeter according to claim 5 wherein said porous tube is fabricated from sintered stainless steel so as to provide pores of long length with respect to their diameter.

9. In a flowmeter of the type including a heated conduit sensor member and a flow divider for shunting a portion of a fluid flow away from said heated conduit sensor member, an improved flow divider comprising:
a porous tube having an inlet end for receiving a portion of said fluid flow to be measured, said tube having a plurality of longitudinally extending projections on an inner surface thereof;
a generally cylindrically shaped plug, inserted within said tube and having a threaded outer surface, the thread diameter of said plug being slightly larger than the inside diameter of said tube, said plug tapping said projections as the plug moves within said tube to form a seal against said fluid between said tube and the plug; and
means for adjusting the position of said plug relative to said tube to vary the total porous surface area exposed to said fluid thereby regulating the amount of flow through the tube.

10. In a flowmeter according to claim 9, said porous sleeve including pores in the size range of 2-50 microns.

11. In a flowmeter according to claim 9, the inlet end of said porous tube being threaded to permit selective attachment and interchangeability with the flowmeter.

12. In a flowmeter according to claim 9, said porous tube being fabricated from a sintered stainless steel so as to provide pores of long length with respect to their diameter.

* * * * *